UNITED STATES PATENT OFFICE.

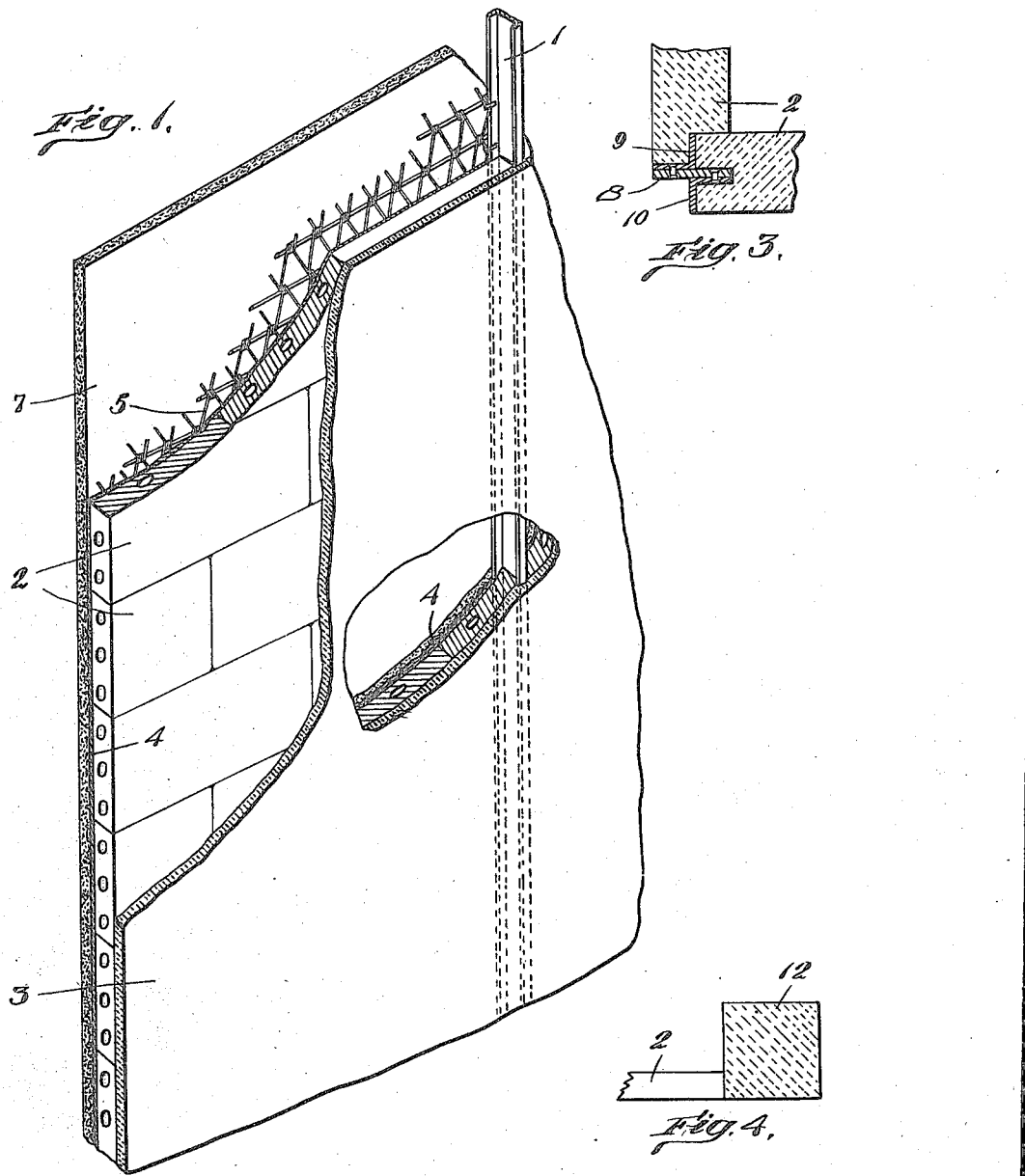
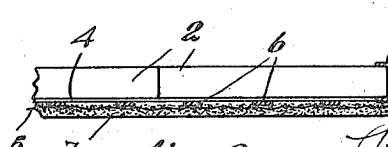

ROYCE W. GILBERT, OF BOSTON, MASSACHUSETTS.

BUILDING-WALL.

1,188,065.  Specification of Letters Patent.  Patented June 20, 1916.

Application filed September 1, 1914. Serial No. 859,710.

*To all whom it may concern:*

Be it known that I, ROYCE W. GILBERT, a citizen of the United States, residing at Boston, in the county of Suffolk and State of Massachusetts, have invented an Improvement in Building-Walls, of which the following is a specification.

This invention relates to a building wall involving cement in its construction, and has for its object the construction of a wall which is very strong, durable, heat-insulating, and fire-proof, the component parts of which are easily obtainable and inexpensive, and which may be easily, quickly, and cheaply assembled, the labor cost being substantially reduced as compared with building walls of ordinary construction, and which, when assembled, will resist dampness and change of temperature, and the effects of expansion and contraction.

This invention comprehends essentially the employment of a frame, the component parts of which are rigidly secured together, and blocks arranged to fill the openings or spaces in said frame, said blocks being secured or bonded together by a cementitious substance, a layer or coating of a lubricant extended over the outside of said blocks, which also renders the blocks impervious to moisture, a metal reinforcement extended over said coated blocks which is attached to the frame, being thereby supported independently of the blocks, and a layer of cement applied to and extended over the outside of the coated blocks and frame, in which the metal reinforcement is embedded.

In the preferred embodiment of my invention for general uses the frame is composed of structural steel, the component parts of which are rigidly secured together, yet for more specific uses the frame may be composed of columns, beams, etc., of cement or wood, or combinations of these elements. Also, in the preferred embodiment of my invention the blocks are composed of gypsum, which is light, durable, inexpensive and easily obtainable in any desired shapes and sizes; and as a bonding cement, I prefer to employ gypsum plaster, although plaster of Paris and other kinds of cement may be employed. Furthermore, as a lubricant, which adheres to gypsum blocks, and has the quality of rendering said blocks impervious to moisture, asphaltum or equivalent substance is employed, which preferably contains or has added to it an oil, thereby to increase its efficiency for the purposes herein designed.

Figure 1, is a perspective view of the building wall embodying this invention, the frame being composed of structural steel. Fig. 2 is a detail to be referred to. Fig. 3, is a detail view illustrating a modified form of steel column. Fig. 4, is a detail view illustrating a part of the frame composed of cement.

Referring to Fig. 1, 1, represents one of the steel uprights or columns of a structural steel frame, it being understood that the entire frame of the wall or of the building including the beams, girders, etc., is or may be composed of what is commonly known as structural steel, the component parts of which are rigidly secured together. The upright or column here shown is represented as a channel-bar, and so far as my invention is concerned, other forms of uprights or columns, and also of beams and girders may be employed.

A plurality of gypsum blocks 2, are arranged in the openings or spaces of the frame, said blocks being superimposed to form a tie, and arranged in rows with the joints broken, as in ordinary masonry. These blocks are usually about three inches thick and approximately two feet long and 12 and 14 in. high. In case the channeled-columns are employed as parts of the frame, the blocks may be made of a thickness corresponding to the width of the channels in the columns, so that the ends of the blocks will enter the channels. These blocks when composed of gypsum are very light, yet they are of high heat-insulating value which is a decided advantage. They may have holes extended through them which result in reducing their weight, and also in providing a plurality of dead air spaces, and also in forming conduits for special purposes. These blocks are secured together or bonded usually by a cementitious substance or bonding cement 3, preferably a gypsum plaster composed of one part gypsum and two parts sand, thoroughly mixed and having water added to the mixture in suitable amount. The bonding-cement 3, will be arranged in layers between the blocks, as is common in masonry, thereby to complete a solid substantial structure. In case gypsum plaster is employed as the bonding cement, which is the same material of which the blocks are composed, a monolithic structure is produced, which is very durable. When using gypsum blocks, gypsum plaster as a bonding material possesses advantages over many other kinds of cement, as it strongly adheres to the blocks and has great tensile strength, which prevents it from cracking or crumbling away.

A layer 30 of gypsum plaster, preferably mixed with fiber, and of a substantial thickness is applied to or extended over the entire inner faces of the blocks, which layer also may be extended over the inner exposed portions of the adjacent parts of the frame, and thereby form a continuous layer on the inside of the wall, and the inside surface of said layer 30 may be smoothly finished and may be painted, papered or decorated in any other suitable manner, or left in the rough.

A layer 4, of asphaltum, preferably, although tar will do, and preferably containing some oil, is applied to the outer faces of the blocks 2, which extends uniformly over said blocks and the bonding-cement 3 therebetween, and said layer renders the blocks impervious to moisture, and also serves as a lubricant between said blocks and the material which is applied to the outside thereof, as will be hereinafter described. In lieu of asphaltum or tar, with or without an oil, other materials may be employed to render the blocks impervious and to serve as a lubricant.

A substance such as asphaltum or tar, and containing an oil is especially well suited to the purposes of my invention, for the reason that the faces or sides of the gypsum blocks are usually covered with a dry pulverized powder, which prevents many substances from intimately associating with them, whereas asphaltum or tar, particularly when having mixed with it an oil, will become intimately associated with the blocks, the oil penetrating the surfaces thereof, or being absorbed, leaving the heavier body on the surfaces, and tightly adhering thereto, and to this coated or painted surface the cement hereinafter referred to will adhere.

Metal reinforcement 5, such as ordinary expanded metal, or woven-wire, is extended over the outside of the bonded and coated blocks, and is attached by clips or other means to the frame. The metal reinforcement may be arranged contiguous to the coated blocks, as represented in Fig. 1, or it may be arranged a short distance away from them, say three-eighths of an inch or thereabouts, and when arranged remote from them, it may be held from coming in contact with them by narrow furring strips 6 of steel, arranged vertically or horizontally or otherwise, on the outside of the blocks, say twelve inches apart, said strips being attached to the metal reinforcement or to the frame or to both, and thereby held in place, at least until otherwise supported.

In case the frame is composed of steel and the reinforcement is attached to it instead of to the blocks, said reinforcement and frame are permitted to expand and contract together.

The entire structure thus described, has applied to its outer side or face, a layer 7 of cement of any usual or suitable composition, said cement being applied by means of a cement gun, well known in the art, whereby the cement molecules are permitted to attain their initial set after being applied. The reinforcement thus becomes embedded in the cement. If said cement is uniformly applied, which, however, is not usually the case, it may be left in the rough, otherwise it may be smoothed by a surfacing implement and by the addition of more cement wherever required, or the exterior surface may be made to embody different designs and finishes. The cement applied in this manner is sometimes called "gunite," and is herein referred to as "pressure-applied" cement, to distinguish it from the ordinary stucco work. It may be quickly and easily applied, and forms a very durable outer coating or layer which is substantially impervious to moisture. When the cement gun or equivalent apparatus is used the pressure of air and cement against the coated blocks usually acts to force outward the metal-reinforcement for a short distance, and in such case the furring-strips need not be employed.

It will be observed that the layer 4 is interposed between the outer faces of the blocks and the cement layer 7, and permits adherence of said cement layer 7 with it, and by means of it the connection of the cement layer with the blocks, and this is of importance as the co-efficient of expansion of the cement and steel reinforcement is relatively high, as compared with that of the blocks, and if the cement layer was applied directly to the blocks there would be great danger of one or the other or both cracking, furthermore, in case gypsum blocks are employed it has been found that the cement layer does not adhere to them tightly. As the material composing the layer 4 has yielding or plastic qualities, movement is permitted of the cement layer 7 relative to the blocks, either by a stretching, pulling, drawing, or working of the material composing said layer, and as these properties of said layer are characteristic of a lubricant, it is herein referred to as a lubricant.

Referring to Fig. 3, another form of steel column is shown which is composed of a flat strip 8 of steel to which two angle-irons 9 and 10 are secured, but this modification is intended to only illustrate the fact that other forms of steel elements may be employed.

Referring to Fig. 4, a frame is shown composed of cement columns 12, and it will be understood that my invention is further applicable to a frame of wood, and also to a frame composed of various combinations of steel, cement and wood, and which involve two or more of said materials.

I claim:—

1. A building wall composed of a structural steel frame, gypsum blocks arranged in openings of said frame, bonding-cement arranged in the spaces between them to secure them together, a layer of a lubricant extended over the outside of said blocks having qualities which renders them impervious to moisture, metal-reinforcement extended over the outside of said coated blocks and attached to the frame, and a layer of pressure-applied cement extended over the outside of said coated blocks and frame in which the metal-reinforcement is embedded, substantially as described.

2. A building wall composed of a structural steel frame, gypsum-blocks superimposed and arranged in a tier in openings of said frame, means to secure said blocks together, a layer of a lubricant containing asphaltum applied to the outside of said blocks, metal-reinforcement extended over the outside of said asphaltum-coated blocks and attached to the frame, a layer of cement extended over the outside of the coated blocks and frame, in which the metal-reinforcement is embedded, and a layer of plaster applied to and extended over the inside of the blocks and frame, thereby to cover and conceal them, substantially as described.

3. A building wall composed of a structural steel frame, a heat-insulating filling consisting of gypsum blocks cemented together and coated on the inside with gypsum plaster, and coated on the outside with a damp resisting and adherent lubricant, a metal-reinforcement arranged at the outside of said gypsum wall which is attached to said steel frame, and a coating of cement applied to said lubricant and filling the interstices of said metal-reinforcement, and forming the exterior wall of the building, substantially as described.

4. A building wall comprising a frame, a tier of blocks supported by the frame, an outer layer of cement having metal reinforcing means also supported by said frame, which layer is relatively free with respect to the tier of blocks to thereby expand and contract independently thereof.

5. A building wall including a frame, blocks arranged in the openings thereof, metal reinforcement extended over the outside of said blocks and attached to the frame and a layer of cement extended over the outside of said blocks in which the metal reinforcement is embedded, said layer being relatively free with respect to the blocks to thereby expand and contract independently of the blocks.

6. A building wall including a frame, blocks arranged in the openings thereof, metal reinforcement extended over the outside of said blocks and attached to the frame, and a layer of cement extended over the outside of said blocks and frame, the metal reinforcement being embedded in the layer of cement, said layer of cement being relatively free with respect to the blocks to thereby expand and contract independently of the blocks.

In testimony whereof, I have signed my name to this specification, in the presence of two subscribing witnesses.

ROYCE W. GILBERT.

Witnesses:
B. J. NOYES,
H. B. DAVIS.